Nov. 4, 1930.    A. C. HARDY    1,780,231
OPTICAL MEASURING INSTRUMENT
Filed Jan. 19, 1928    2 Sheets-Sheet 2
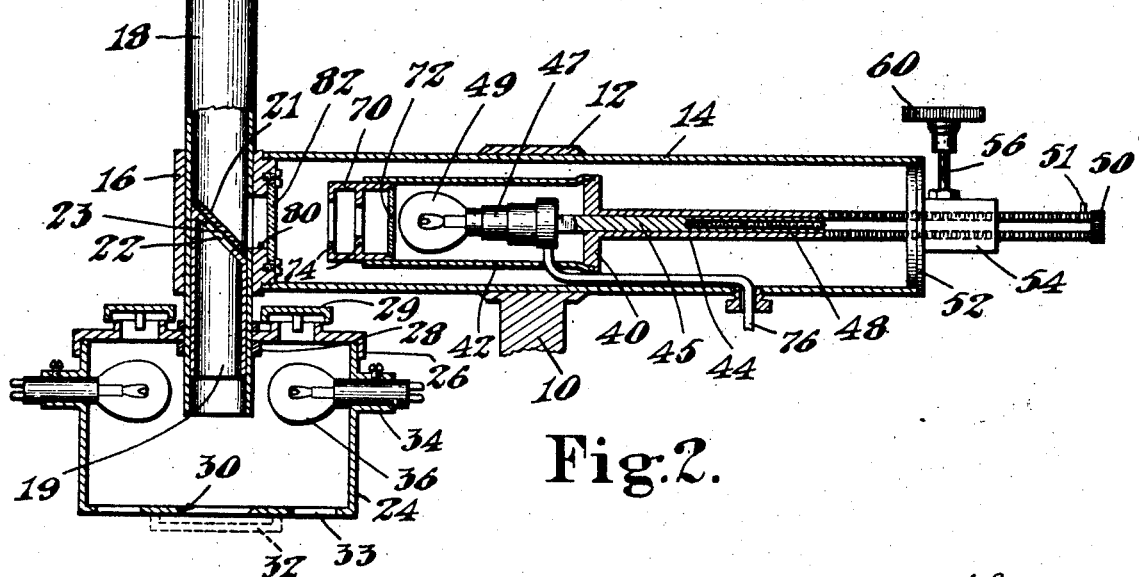
Fig.4.
Fig.2.
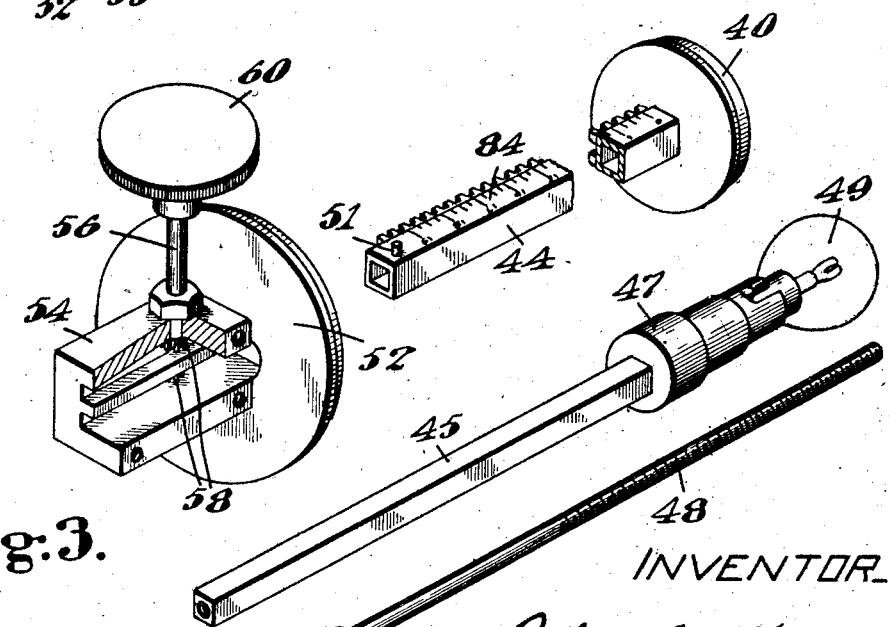
Fig.3.
INVENTOR
Arthur C. Hardy
by H. W. Hemenway Atty.

Patented Nov. 4, 1930

1,780,231

UNITED STATES PATENT OFFICE

ARTHUR C. HARDY, OF WELLESLEY, MASSACHUSETTS, ASSIGNOR TO GODFREY L. CABOT, INC., OF BOSTON, MASSACHUSETTS, A CORPORATION OF MASSACHUSETTS

OPTICAL MEASURING INSTRUMENT

Application filed January 19, 1928. Serial No. 247,881.

This invention, in one aspect, relates to optical measuring instruments, and more particularly to instruments for photometrically measuring or comparing by reflected light nearly black substances or those having low reflecting power. A good example of such substances is carbon black and the instrument herein shown, while designed particularly for use in connection with that substance, might be used to good advantage in the examination of any substance having low reflecting characteristics.

Heretofore, it has not been considered practical to make photometric comparisons of substances of low reflecting power because the amount of light available is far below the ordinary adaptation level of the eye; that is to say, of such low intensity that the eye is unable to detect variations in its brightness. In the case of carbon black, for example, its reflecting power is less than one per cent of that of a perfect diffuse reflector. The amount of light reaching the eye from a specimen of carbon black is very small and, therefore, variations in the amount of reflected light due to differences in quality or structure of the carbon black cannot be detected by the human eye.

In a broad aspect, the present invention consists in an instrument organized for intensely illuminating the sample, associated with means for comparing by reflected light the brightness of the illuminated sample with the brightness of a standard of illumination. As herein shown, this is effected by disposing a series of lamps in the proper position for maximum illumination of the specimen to be examined, together with means for bringing the light reflected by the specimen and the light of the standard unit into a single field of view, where their brightness can be most conveniently compared.

As a standard, I prefer to employ an illuminated translucent element, movable with its source of light toward and from the photometric field so that the brightness of the latter may be varied for purposes of comparison. In this connection, an important feature of the invention consists in the provision of means for adjusting the zero degree of illumination of the standard by varying the distance of its source of light with respect thereto independently of the bodily movement of the unit as a whole.

Another feature of the invention consists in arranging the lamps for illuminating the specimen in the same circuit with the primary source of light for the standard unit so that variations in voltage shall equally affect both the illumination of the specimen and the photometric field.

In accordance with another important feature of the invention, I provide a color filter for cutting out all color rays from the light passing to the eye-piece except those from a small portion of the spectrum. This arrangement facilitates accurate comparison of intensity of illumination by eliminating chromatic differences which are likely to affect different observers in dissimilar manner. As herein shown, a red filter is employed and in dealing with carbon black this is believed to be preferable, partly because the variation in reflecting power between different specimens is greatest in the red end of the spectrum.

In another of its aspects, my invention comprises a novel method of photometrically measuring the reflecting power of carbon black. It consists in intensely illuminating a sample thereof to raise its brightness to a level approximating good photometric practice and comparing the brightness of the illuminated sample with the brightness of a photometric field of measured variable brightness.

I have discovered that by this method it is possible, for the first time, to distinguish from each other carbon blacks having different mechanical or chemical characteristics. This is extremely important and marks a far reaching step in the progress of the art, for the reason that it renders available a method of analytical examination and determination of carbon black qualities in a short space of time, a process heretofore requiring at least two days and necessitating the manufacture and testing of composite samples.

The invention will be best understood and appreciated by considering first the following description of apparatus comprising a preferred embodiment thereof, selected for purposes of illustration and shown in the accompanying drawings, in which Fig. 1 is a view in perspective of the instrument;

Fig. 2 is a view in longitudinal section;

Fig. 3 is a view in perspective of parts of the standard unit; and

Fig. 4 represents the field of vision of the instrument.

Figure 1:
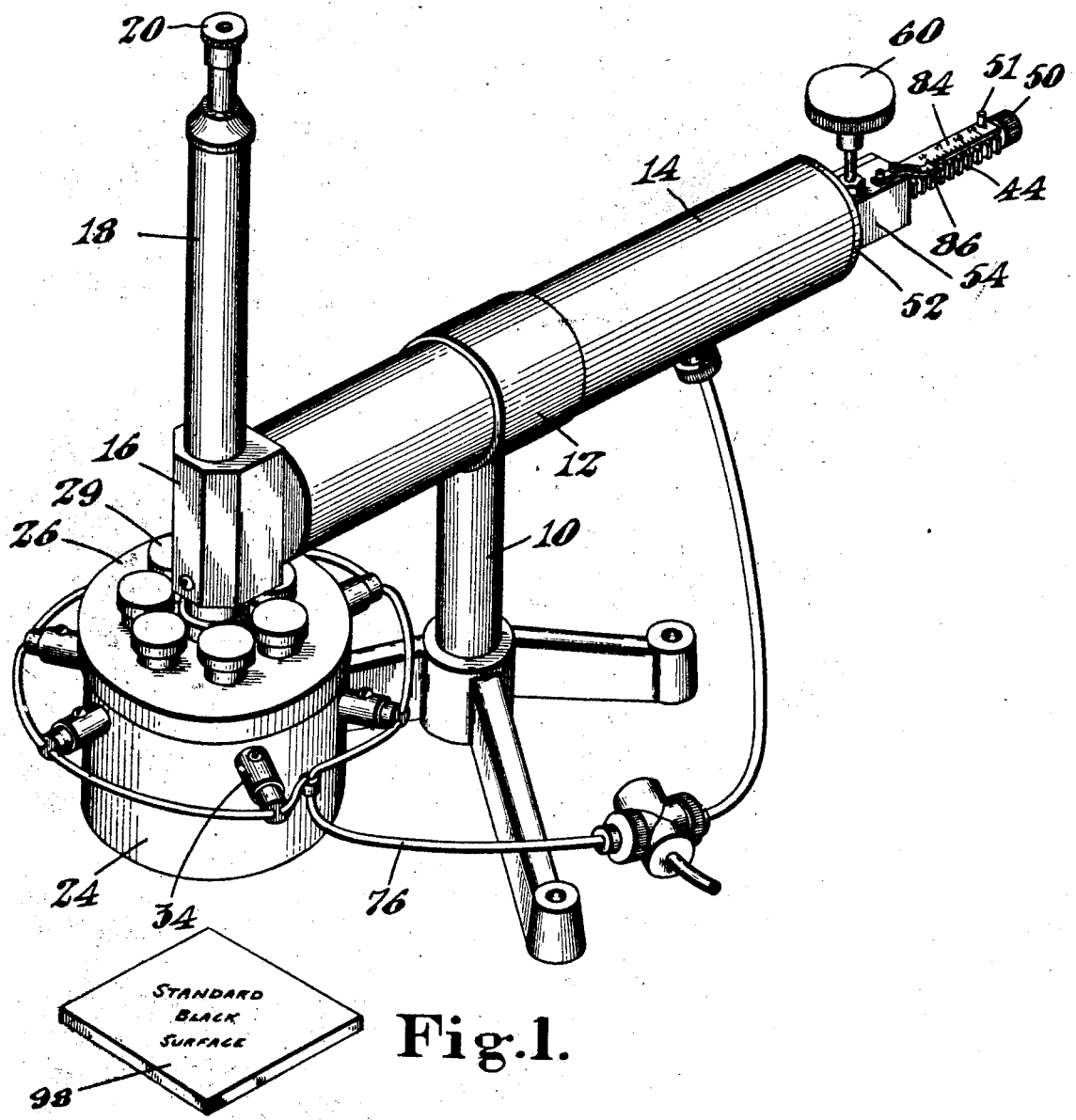

The parts of the instrument are supported and carried by a stand or tripod 10, having a horizontally disposed cylindrical hub 12 at its upper end. The main barrel 14 of the instrument carries within it the illuminated standard unit and is threaded at its left end, as viewed in Fig. 2, for the reception of a threaded block 16 having a vertical aperture in which is disposed the tube 18, carrying the eye-piece 20 at its upper end and the cylindrical chamber 24 at its lower end. The tube 18 is rigidly secured in the block 16 and provided with flanges 28 for engaging and rigidly holding a cover disk 26 having a down-turned rim. Secured within the rim of the cover disk 26 is a cylindrical member, forming the walls of a chamber 24 and having a series of equally spaced lamp sockets 34 disposed circumferentially about it. The bottom of the chamber is provided with a central aperture 30, beneath which the sample to be examined is presented. As herein shown, the sample comprises a shallow dish or boat 32 filled with carbon black, which has been leveled by having a straight edge passed over the edges of the dish.

Each of the lamp sockets 34 carries a lamp 36, there being six in all equally spaced and closely adjacent to each other but not in contact. They are so disposed with reference to the aperture 30 as to subject the sample to the maximum intensity of illumination, light striking the sample at an angle of approximately forty-five degrees. The bottom of the chamber 24 is provided also with a series of openings 33 for purposes of ventilation and the cover disk 26 is provided with a series of ventilator caps 29 for the same purpose. Within the lower end of the tube 18 is secured a concentric tube 19, with a flange 22 formed at its upper end to constitute a mounting for a mirror 21 disposed at forty-five degrees to the axis of the tube and having an aperture 23 through its silvered backing through which the sample may be directly viewed.

The other end of the horizontal tube 14 is closed by a cap 52, having an outwardly projecting stem 54 through which extends a ribbed guideway for the reception of a square rack bar 44. At its inner end, the rack bar carries a head 40 to which is secured a tube 42 constituting a carrier for the standard unit. The stem 54 has bearings for a vertical shaft 56, having at its lower end a pinion 58 which meshes with the rack bar 44 and at its upper end a knurled head 60 by which the shaft 56 may be turned to move the rack bar and its associated parts bodily longitudinally of the tube 14.

Within the rack bar 44 is disposed a square bar 45 of smaller cross section which carries at its forward end a lamp socket 47 for the lamp 49, and this constitutes the primary source of illumination for the standard unit and the photometric field, as will be presently explained. The lamp carrying bar 45 is internally threaded to receive the end of a long adjusting screw 48 which extends outwardly to the end of the rack bar 44, where it is provided with a knurled head 50. The head 50 has a circumferential groove which engages a stationary pin 51 in the outer end of the rack bar 44 and serves to anchor the adjusting screw against longitudinal movement, so that when it is turned the lamp-carrying bar 45 and the lamp 49 are adjusted longitudinally. The sample-illuminating lamps 36 and the lamp 49 are connected in the same electric circuit by leads 76, so that they all partake of variations caused by fluctuation in voltage.

At its left end, as viewed in Fig. 2, the tube 42 carries a short tube 70 having an opal glass disk 72 at its inner end by which is dispersed the light of the lamp 49. The tube 70 also has a pair of perforated diaphragms 74, designed to cut out internal reflection of the light from the inner surface of the tube and so eliminate a possible inaccuracy in the intensity of the light emitted by the standard unit in different longitudinal settings of the lamp 49.

The tube 18 and block 16 are provided with a transverse aperture 80, located in line with the axis of the tube 14 and opposite the mirror 21. An opal glass disk 82 is mounted in the face of the aperture 80 and constitutes in effect the photometric field of the eye-piece 20. This, as will be apparent from the foregoing description, is illuminated by the standard unit, having the primary source of light in the lamp 49, and the intensity of illumination of the disk 82 varies inversely as the square of the distance from it of the illuminated disk 72. The position of the disk 72 constituting this surface of standard brightness is indicated by a scale 84 at the outer end of the rack bar 44, which is read in connection with a stationary index 86 secured to the stem 54.

A feature of the invention already mentioned consists in providing in the eye-piece 20 a red filter 94, so that only red rays are permitted to reach the eye of the observer from the photometric field 82 and the sample. While the red rays have proved most satisfactory in dealing with carbon black, it will be understood that a filter of a different color might be employed with good advantage in dealing with a substance of different characteristics.

Fig. 4 indicates the appearance of the field of vision of the eye-piece 20, the outer portion 90 representing the reflection from the mirror 21 of the photometric field formed by the disk 82 and the central elliptical portion representing the appearance of the illuminated sample as viewed directly through the aperture 23 of the mirror 21.

In using the instrument hereinabove described, a specimen is first prepared of the substance which is to be taken as the standard. In dealing with carbon black, it is convenient to use as the standard specimen a glazed tile 98 with a black surface which is permanent and can be conveniently cleaned. The tile is placed at the aperture 30 of the chamber 24 and illuminated by the lamps 36. The rack bar 44 is then moved until the scale reads 100, or any other convenient arbitrary figure, thus establishing the distance between the standard surface of brightness of the disk 72 and the photometric field 82. If the observer can now detect any difference in the brightness of the portions 90 and 92 of the field of vision, the lamp adjusting screw 48 is turned to move the lamp 49 further from or nearer to the disk 72 until the brightness of both portions of the field exactly balance. The instrument is thus set for measuring samples of carbon black using the black of the particular specimen tile as the standard.

In measuring samples of other carbon blacks on the basis of this standard, the samples are presented to the instrument and the rack bar 44 moved in or out, as the case may be, by turning the screw 60, to bring about an exact balance of the brightness of the illuminated specimen and the photometric field. The reading of the scale 84 indicates comparatively the amount of light reflected by the sample, as compared with the amount of light reflected by the standard tile. From the characteristic differences in the amount of light reflected by different carbon blacks, the latter may be graded and identified, and a useful comparison established between their photometric measure and other physical or chemical properties.

As illustrating the commercial importance of my invention, I will refer briefly to the rubber trade which now consumes over twenty million pounds of carbon black annually. Heretofore, the only possible method of ascertaining whether a given lot of carbon black had the proper characteristics was actually to manufacture samples of rubber and carbon black composition and then subject these samples to a series of wear, resiliency, hysteresis, and other physical tests. This method of testing required at least two days and frequently fell behind manufacturing routine so that thousands of pounds of rubber filled with carbon black of unsatisfactory quality have been made up. Now, however, by the method and instrument of my invention, it is possible to ascertain in five minutes whether the carbon black of any particular lot is of the required standard. The resulting advantages in respect to control of product and elimination of defective mixtures will be apparent.

Having thus described my invention, what I claim as new and desire to secure by Letters Patent is:

1. An optical instrument for measuring the reflecting power of carbon black, comprising means for intensely illuminating a sample thereof to raise its brightness to a level approximating good photometric practice, a surface of standard brightness which is the optical equivalent of an illuminated carbon black specimen, and means including an eye-piece for viewing the brightness of said surface and sample in the same field.

2. An optical instrument for measuring the reflecting power of carbon black, comprising means for illuminating a sample thereof to raise its brightness to a level approximating good photometric practice, a surface of standard brightness movable in a graduated manner, and means including an eye-piece and color filter for viewing the brightness of said surface and illuminated sample in the same field by red light only.

3. The method of measuring the reflecting power of carbon black, which consists in intensely illuminating a sample thereof to raise its brightness to a level approximating good photometric practice, and comparing the brightness of the illuminated sample with the brightness of a photometric field of measured variable brightness.

4. The method of measuring the reflecting power of carbon black, which consists in intensely illuminating a sample thereof to raise its brightness to a level approximating good photometric practice, comparing the brightness of the illuminated sample with the brightness of a photometric field of measured variable brightness, and using in the latter step only light from a limited portion of the spectrum.

5. The method of comparatively ascertaining the reflecting power of nearly black substances, which consists in intensely illuminating a tile having a standard black surface, illuminating a photometric field to the same degree of brightness, replacing the tile by samples of the substance, and varying in measured manner the brightness of the photometric field to balance the brightness of the respective samples.

6. An optical instrument for measuring the reflecting power of nearly black substances, comprising means providing a chamber adapted to receive a sample to be tested, lighting means within the chamber for intensely illuminating the sample, a tube extending into the chamber in a position directed toward the sample location and excluding the direct rays of the said lighting means, a plate providing a reflecting surface in the tube and having an opening therethrough and through which the sample location can be viewed, the tube having an opening therethrough adjacent to the plate, a second tube cooperating with the first tube at said opening, and a light within the second tube adjustable toward and from the plate in a manner varying the intensity of its illumination on the plate, the illuminated face of the plate and the sample being visible in one field through the first tube.

ARTHUR C. HARDY.